US012026596B2

(12) United States Patent
Zhang et al.

(10) Patent No.: US 12,026,596 B2
(45) Date of Patent: *Jul. 2, 2024

(54) COMPUTERIZED SYSTEM AND METHOD FOR ADAPTIVE STRANGER DETECTION

(71) Applicant: VERIZON PATENT AND LICENSING INC., Basking Ridge, NJ (US)

(72) Inventors: Yang Zhang, Sunnyvale, CA (US); Guy Dassa, Mamaroneck, NY (US); Atte Lahtiranta, Los Altos, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 8 days.

This patent is subject to a terminal disclaimer.

(21) Appl. No.: 17/462,387

(22) Filed: Aug. 31, 2021

(65) Prior Publication Data

US 2021/0397823 A1 Dec. 23, 2021

Related U.S. Application Data

(63) Continuation of application No. 16/573,245, filed on Sep. 17, 2019, now Pat. No. 11,126,830.

(51) Int. Cl.
*G06N 20/00* (2019.01)
*G06F 16/71* (2019.01)
(Continued)

(52) U.S. Cl.
CPC ............. *G06N 20/00* (2019.01); *G06F 16/71* (2019.01); *G06F 16/743* (2019.01); *G06F 16/784* (2019.01); *G06F 16/787* (2019.01); *G06V 10/449* (2022.01); *G06V 10/761* (2022.01); *G06V 10/7715* (2022.01); *G06V 40/168* (2022.01); *G06V 40/173* (2022.01); *G06V 40/50* (2022.01)

(58) Field of Classification Search
CPC ........... G06K 9/00295; G06K 9/00926; G06K 9/4619; G06K 9/6232; G06K 9/00268; G06K 9/6215; G06F 16/787; G06F 16/71; G06F 16/743; G06F 16/784; G06N 3/02
USPC ........................................................ 382/118
See application file for complete search history.

(56) References Cited

U.S. PATENT DOCUMENTS

| 9,747,795 B1* | 8/2017 | Espinosa ................ G08B 15/00 |
| 2002/0071033 A1* | 6/2002 | Gutta ........................ G07C 9/37 |
| | | 348/E7.086 |

(Continued)

*Primary Examiner* — Stephen P Coleman

(57) ABSTRACT

Disclosed are systems and methods for improving interactions with and between computers in computerized security and content monitoring, hosting and providing devices, systems and/or platforms. The disclosed systems and methods provide a novel framework that adaptively distinguishes between known people versus unknown people based on a dynamically applied, anonymous facial recognition methodology. The disclosed framework provides such functionality by recognizing faces within captured images without storing any information or annotations regarding or revealing the captured person's identity. The framework is configured to adaptively learn to distinguish between faces seen for the first time and faces it has previously seen by locally processing a captured image and only sending face embeddings to a network location for future comparisons of subsequently, anonymously captured images.

18 Claims, 5 Drawing Sheets

(51) Int. Cl.
 *G06F 16/74* (2019.01)
 *G06F 16/783* (2019.01)
 *G06F 16/787* (2019.01)
 *G06V 10/44* (2022.01)
 *G06V 10/74* (2022.01)
 *G06V 10/77* (2022.01)
 *G06V 40/16* (2022.01)
 *G06V 40/50* (2022.01)

(56) References Cited

U.S. PATENT DOCUMENTS

| | | | |
|---|---|---|---|
| 2010/0111377 A1* | 5/2010 | Monroe | G07C 9/38 |
| | | | 382/118 |
| 2010/0176947 A1* | 7/2010 | Hall | G08B 13/248 |
| | | | 340/572.1 |
| 2011/0069085 A1* | 3/2011 | Weber | G06T 11/60 |
| | | | 345/620 |
| 2015/0199896 A1* | 7/2015 | Estes | G08B 25/016 |
| | | | 340/541 |
| 2017/0308919 A1 | 10/2017 | Karuvath et al. | |
| 2019/0034747 A1* | 1/2019 | Lupowitz | G06V 10/772 |
| 2019/0318153 A1 | 10/2019 | Liu et al. | |

* cited by examiner

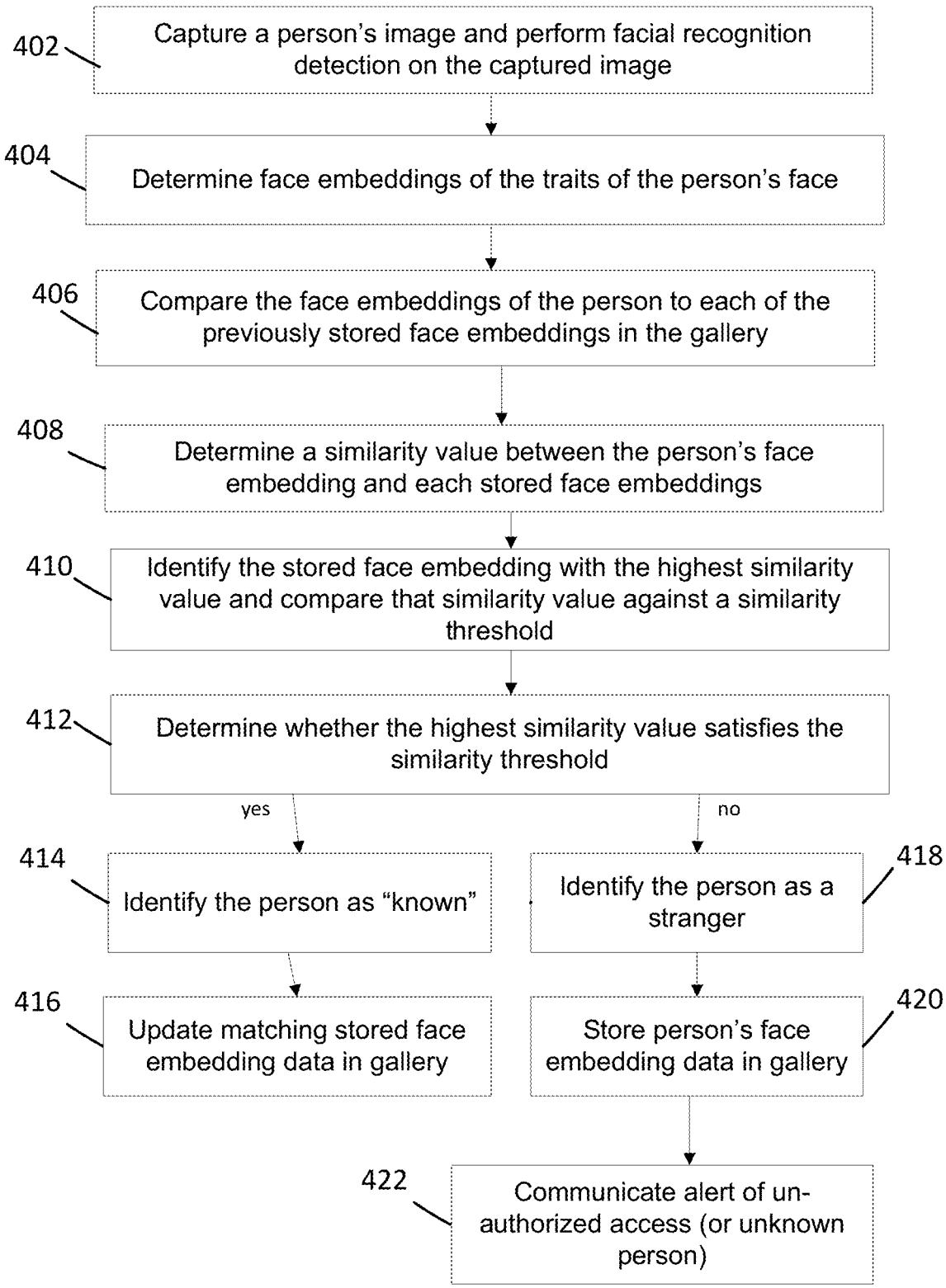

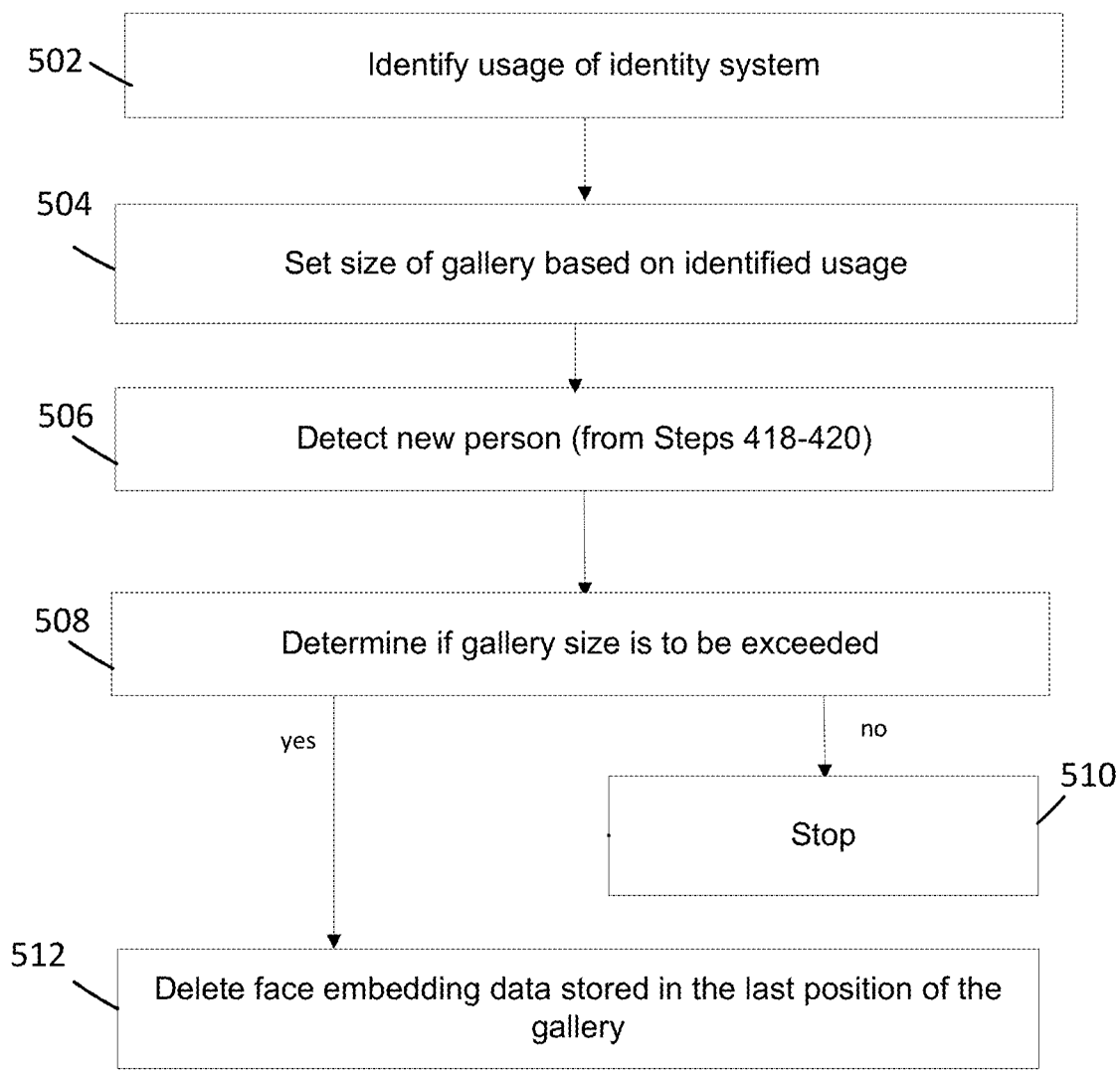

COMPUTERIZED SYSTEM AND METHOD FOR ADAPTIVE STRANGER DETECTION

This patent application claims the benefit of and is a continuation of U.S. patent application Ser. No. 16/573,245, filed Sep. 17, 2019, which is incorporated by reference herein in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of network based computerized security and identity monitoring, hosting and providing devices, systems and/or platforms by modifying the capabilities and providing non-native functionality to such devices, systems and/or platforms through a novel and improved framework for adaptively distinguishing between known people versus unknown people based on a dynamically applied, anonymous facial recognition methodology.

BACKGROUND

Conventional security and identity recognition systems rely on facial recognition or face embedding clustering, which involves the mapping of face images to pre-labeled people identities. By doing this, the captured person's privacy is effectively compromised. For example, not only is their identity revealed, but so are the locations they have visited. Moreover, even if this data is not shared, once it is stored, it is susceptible to malicious and unverified attacks, regardless of how secure the storage of such information is.

SUMMARY

Thus, there is a need for a facial recognition system that anonymously detects whether a captured image of a person digitally represents a person that is known or unknown (e.g., a stranger). The disclosed framework provides such functionality by recognizing faces within captured images without storing any information about the captured person's identity or the circumstances of its capture. The framework is configured to adaptively learn to distinguish between faces seen for the first time and faces it has previously seen.

The disclosed framework is configured to more securely process and house user data. That is, rather than having images captured and sent over a network to another location (or remote network location) for processing, as in conventional systems, the disclosed systems and methods can execute or implement a client-side app or library that only sends coded face embeddings outside of the client (or capturing) device environment, thus not compromising any features that may be reverse engineered to form an identity. The back-end receiving server of these face embeddings stores them in "previously seen" data storage (referred to as a "gallery") for use in performing future comparisons with subsequently received facial data. The gallery, which is embodied as a double linked list of facial data stored as tuples, maintains the anonymity of the facial data by not annotating, labelling or tagging the data with any information identifying the person digitally represented by the data.

Thus, in accordance with one or more embodiments, the instant disclosure provides computerized methods for a novel framework that adaptively distinguishes between known people versus unknown people based on a dynamically applied, anonymous facial recognition methodology. In accordance with one or more embodiments, the instant disclosure provides a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., application server, security server, content server and/or client device, and the like) cause at least one processor to perform a method for a novel and improved framework that adaptively distinguishes between known people versus unknown people based on a dynamically applied, anonymous facial recognition methodology.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

According to some embodiments, the disclosed framework identifies an image comprising content depicting a person at a location. The framework then analyzes said image, and based on said analysis, determines information associated with a face of the person depicted by said content, where said face information comprises data indicating characteristics of traits of said face. The framework then compares the face information to a set of face embeddings stored in a storage (which, as discussed below, can be a database or a memory). Each stored face embedding comprises face information for previous person depictions captured at said location. According to some embodiments, the comparison performed by the framework comprises searching said storage for face information matching said determined face information at or above a threshold matching level (e.g., similarity threshold). When a match satisfying the similarity threshold is determined, the person is identified as a known person, and when a match is not determined to satisfy the threshold, the person is identified as a stranger.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 4 is a block diagram illustrating an exemplary data flow in accordance with some embodiments of the present disclosure; and FIG. 5 is a block diagram illustrating an exemplary data flow in accordance with some embodiments of the present disclosure.

DESCRIPTION OF EMBODIMENTS

Figure 1:
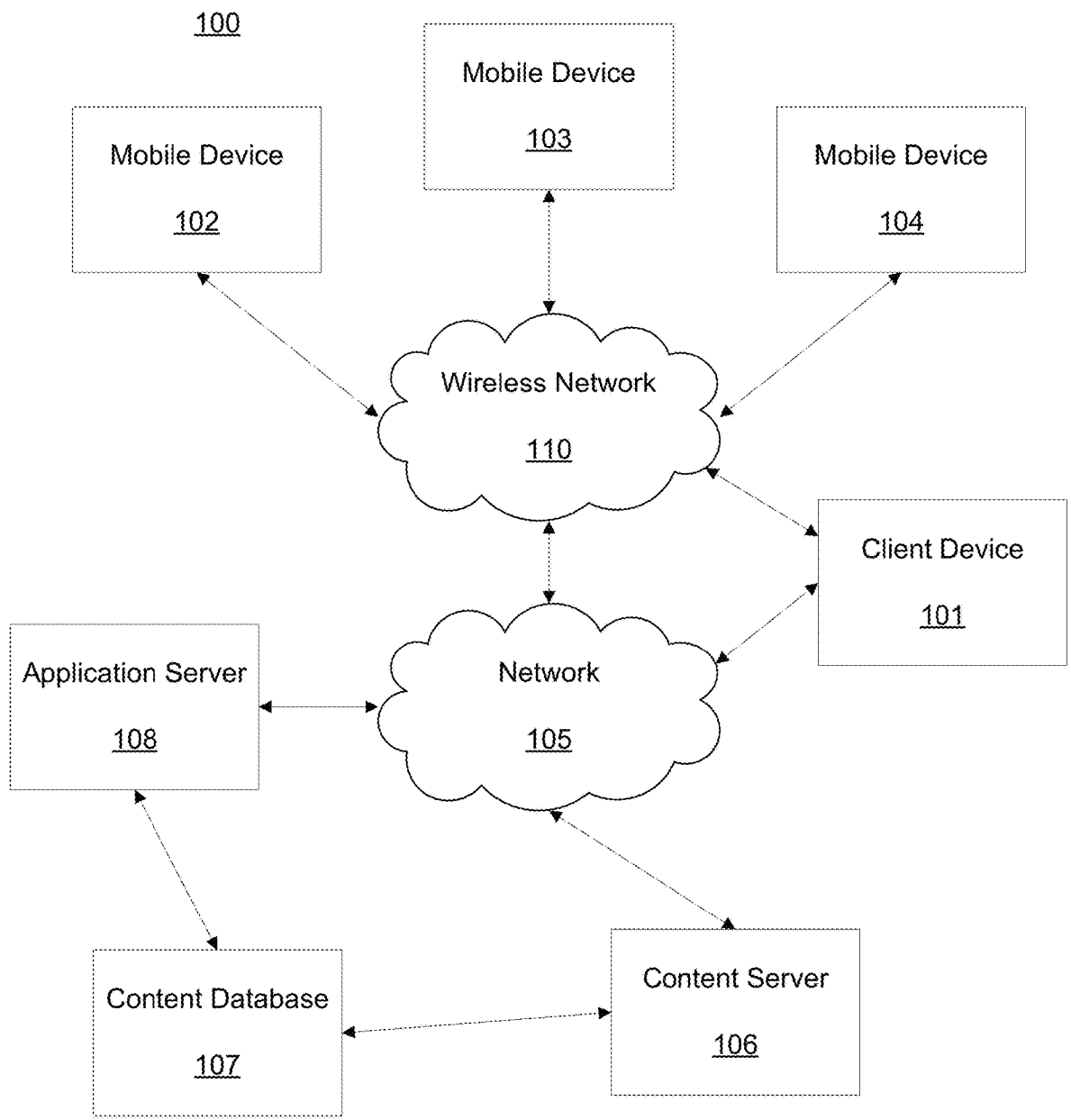
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or $2^{nd}$, $3^{rd}$, $4^{th}$ or $5^{th}$ generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

The principles described herein may be embodied in many different forms. The instant disclosure provides improved systems and methods for providing a framework to computerized security and identity monitoring systems for adaptively distinguishing between known people versus unknown people through a dynamically applied, anonymous facial recognition methodology. The disclosed systems and methods can recognize faces within captured images without storing any information or annotations regarding or revealing the captured person's identity. The framework is configured to adaptively, in a real-time and online setting, learn to distinguish between faces seen for the first time and faces it has previously seen by locally processing a captured image and only sending limited facial data (e.g., face embedding data) to a network location for future comparisons of subsequently, anonymously captured image data.

The disclosed framework, realized and implemented through detection engine 300, as discussed below, is capable of memorizing faces without storing identities. According to some embodiments, as discussed in more detail below, an unknown person (referenced as a "stranger", interchangeably) who is captured regularly by the system can become a recognized person over time. Furthermore, a known person (referenced as a "recognized" person, interchangeably) who is not captured by the system for a predetermined period of time may be forgotten by the system and thus become a stranger.

Currently, there is no existing system, methodology or technique that can achieve the desired adaptiveness. Most of the existing methods over simplify and reduce this problem to a binary classification problem without considering the adaptiveness as discussed above. That is, in most existing systems, a person is either defined as known or unknown, and such classification does not change regardless of the person's activity. However, through the advent of the disclosed functionality, a user's designation can change based on how recent and/or how frequent they visit a location.

For example, as discussed below in relation to FIGS. 4-5, if user Bob comes to work 5 days a week, the framework would recognize that he is "known." However, Bob was just on maternity leave for 12 weeks; therefore, due to the infrequency of his visits to his work location, the system may not recognize his facial data, therefore, he may be, at least initially until his frequency of coming to work increases, be reclassified and recognized as a "stranger."

Furthermore, most of the existing techniques require a system to be pre-trained on a dataset. In fact, even after such pre-training, these systems have a computationally and adaptively hard time generalizing to different deployment environments. A common approach is to fine-tune the model every time when the deployment environment is different. The fine-tuning usually happens offline and is time-consuming. It is not feasible to effectively and efficiently classify people through such systems when adaptiveness and real-time reaction are critical to the system and when deployment environments vary.

Therefore, according to some embodiments, the disclosed framework can be trained in real-time (and not pre-trained like existing systems) to learn to determine whether a person is known or not in an online environment, or as new and subsequent images are captured and processed. Thus, rather than having to be configured for each specific deployment scenario and/or location, the disclosed framework can dynamically adapt to its deployed environment through its streamlined approach to determining whether someone is known or not, and not what that person's exact identity is.

By way of a non-limiting example, a security surveillance system could use the disclosed framework's techniques to detect strangers in different environments without compromising the privacy and identity of the people in these environments. In some embodiments, when a stranger is detected, an alert can be generated, such that un-authorized personnel can be prevented from entering a restricted space.

By way of another non-limiting example, a retailer with the disclosed system could use this technique to analyze the foot traffic entering their stores. For example, measurements can include the effectiveness of marketing campaigns, as well as a volume and mix of visitors over time to influence staffing.

Thus, as discussed herein, the disclosed systems and methods capture an image of a person (or user, used interchangeably), and determines, extracts or otherwise identifies the facial data within the image related to the person. The facial data is analyzed and a digital representation of the person's face is determined.

In some embodiments, the representation, which is referenced and understood as face embeddings by those of skill in the art, can be a set of values (or numbers) that indicate the characteristics, attributes, or features of the captured face's traits, as well as the number of times the person was seen before and the timestamps of such occurrences. The representation can be an n-dimensional feature vector ($f_v$), which can numerically represent such information, as each dimension can represent a face's trait, and the nodes of each dimension can represent each trait's characteristics, attributes and/or features.

These values, as well as how recent (e.g., timestamps) and/or the number of times the face has been captured, are stored in a "gallery" without any labelling or identifying information related to the captured person. In some embodiments, the gallery can be stored in a database. In some embodiments, the gallery can be hosted in memory of the runtime environment and can be periodically synced into a physical storage (e.g., database or files). The gallery, embodied as an n-tuple sequence, stores the face embedding data and the updateable, non-negative number of times (t) over a period of time the data is identified in relation to each other within a data structure that tracks the appearances of each person, and deletes (or expires) those that are not seen again over time.

The gallery is therefore comprised of face embedding data represented by ($f_v$, t) for each observed person, where (t) tracks the number of times the feature vector in the same tuple is observed. Thus, the gallery provides a dynamically updateable and adaptable computerized solution that adapts to new data over time.

For example, if a user is captured at a location by the disclosed framework for the first time, the values of their face (face embedding data) as well as a value indicating how recent they have been there (e.g., "1") will be stored in a "gallery" (e.g., storage which can be a database or memory). Upon detecting a new face and performing the analysis and processing as discussed above and detailed below, the face values of the new face are compared against the stored values. Should the new face match to a degree of similarity (or threshold) to a stored face value, then that stored face value's value will be increased to reflect the reoccurrence of their presence at the location. Should there not be a match, then the database will be updated to store the newly captured face data. In some embodiments, the new face and a stored face can be associated with the same person, such that a single person can have multiple face embeddings stored within the gallery.

According to embodiments of the present disclosure, when a value satisfies a threshold (e.g., at or above a threshold number of occurrences over a period of time), then the person can be identified as a known person. However, until that threshold is satisfied, the person is classified as a stranger.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure.

As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106 and application (or "App") server 108, which are connected to content database 107.

One embodiment of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. In some embodiments, mobile devices 102-104 may also communicate with non-mobile client devices, such as client device 101, or the like. In one embodiment, such communications may include sending and/or receiving messages, capturing and/or sending digital images or video clips, or any of a variety of other forms of electronic communications.

Client devices 101-104 may be capable of sending or receiving signals, such as via a wired or wireless network, or may be capable of processing or storing signals, such as in memory as physical memory states, and may, therefore, operate as a server.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

Network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

The content server 106 may include a device that includes a configuration to provide any type or form of content via a network to another device. Devices that may operate as content server 106 include personal computers desktop computers, multiprocessor systems, microprocessor-based or programmable consumer electronics, network PCs, servers, and the like. Content server 106 can provide a variety of services that include, but are not limited to, security monitoring services, facial recognition services or other forms of biometric detection services. Server 106 may also provide, but is not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like.

Thus, servers 106 and 108, for example, can store various types of applications and application related information including application data and user profile information (e.g., identifying and behavioral information associated with a user). Such data and information can be stored in an associated content database 107, as discussed in more detail below.

Moreover, although FIG. 1 illustrates servers 106 and 108 as single computing devices, respectively, the disclosure is not so limited. For example, one or more functions of servers 106 and 108 may be distributed across one or more distinct computing devices. Moreover, in one embodiment, servers 106 and 108 may be integrated into a single computing device, without departing from the scope of the present disclosure.

Figure 2:
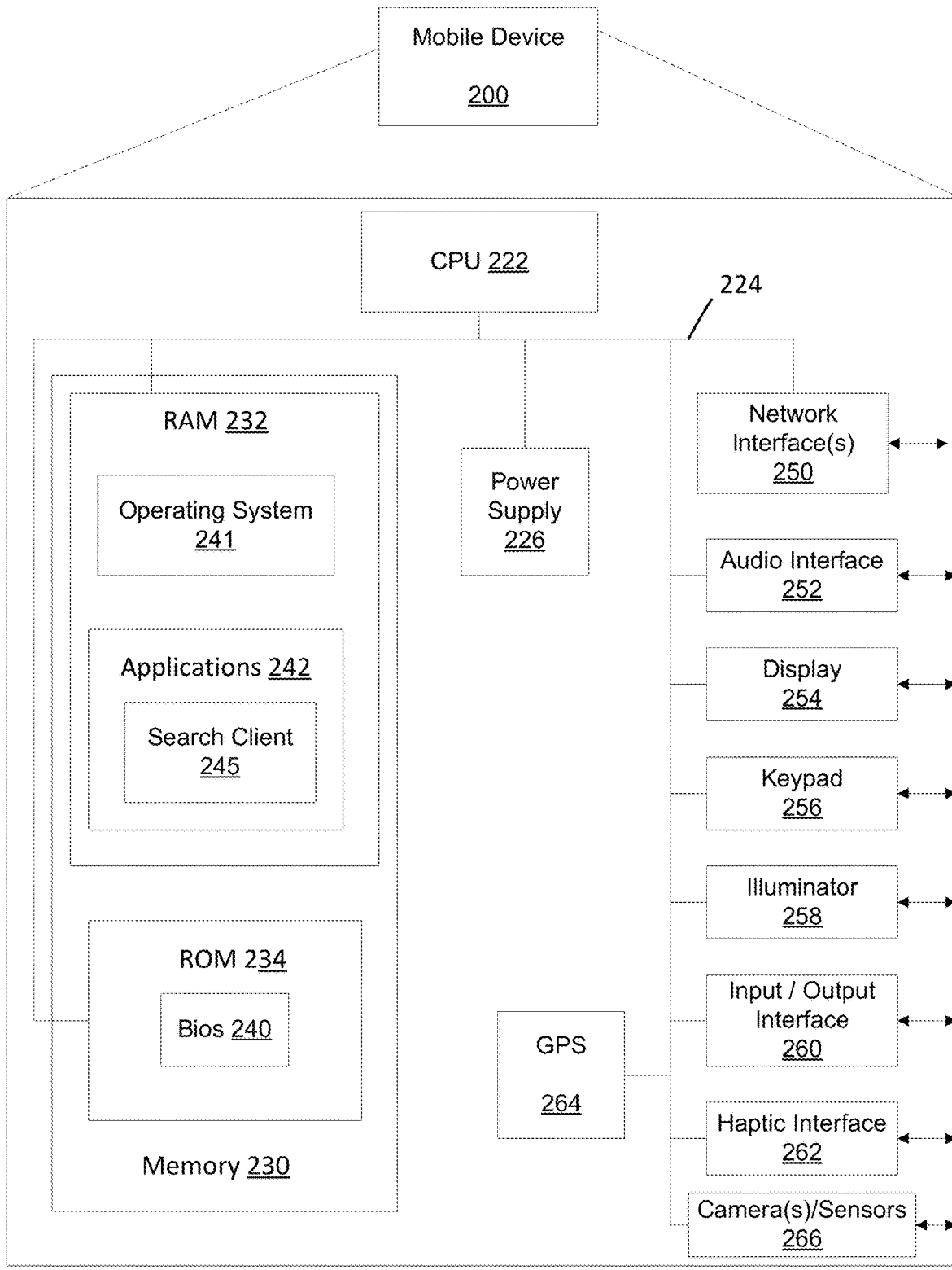
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. Power supply 226 provides power to Client device 200.

Client device 200 may optionally communicate with a base station (not shown), or directly with another computing device. Network interface 250 is sometimes known as a transceiver, transceiving device, or network interface card (NIC).

Audio interface 252 is arranged to produce and receive audio signals such as the sound of a human voice. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. Illuminator 258 may provide a status indication and/or provide light.

Client device 200 also comprises input/output interface 260 for communicating with external. Input/output interface 260 can utilize one or more communication technologies, such as USB, infrared, Bluetooth™, or the like. Haptic interface 262 is arranged to provide tactile feedback to a user of the client device.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, tri-angulation, assisted GPS (AGPS), E-OTD, CI, SAI, ETA, BSS or the like, to further determine the physical location of Client device 200 on the surface of the Earth. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200

Memory 230 further includes one or more data stores, which can be utilized by Client device 200 to store, among other things, applications 242 and/or other information or data. For example, data stores may be employed to store information that describes various capabilities of Client device 200. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Applications 242 may further include search client 245 that is configured to send, to receive, and/or to otherwise process a search query and/or search result.

Having described the components of the general architecture employed within the disclosed systems and methods, the components' general operation with respect to the disclosed systems and methods will now be described below with reference to FIGS. 3-5.

Figure 3:
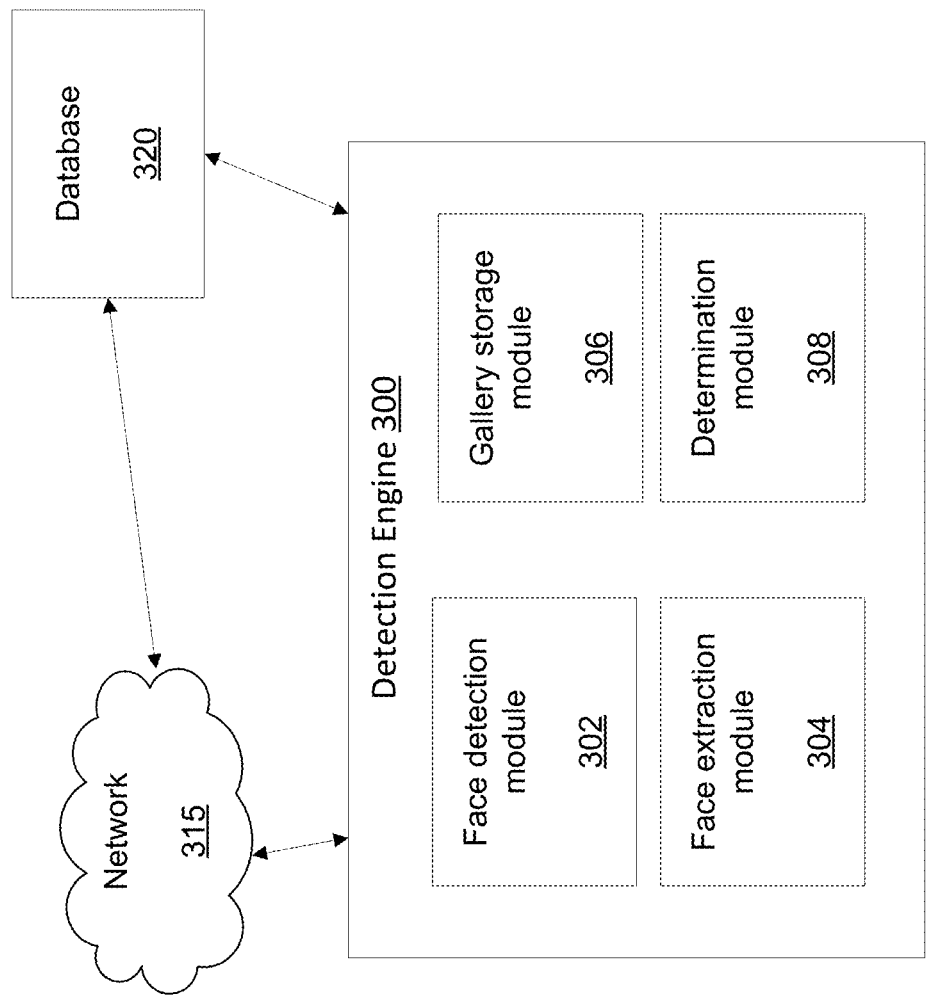
FIG. 3 is a block diagram illustrating components of an exemplary system in accordance with embodiments of the present disclosure.

FIG. 3 is a block diagram illustrating the components for performing the systems and methods discussed herein. FIG. 3 includes detection engine 300, network 315 and database 320. The detection engine 300 can be a special purpose machine or processor and could be hosted by an application server, content server, security server, web server, third party server, client computing device, and the like, or any combination thereof.

The database 320 can be any type of database or memory, and can be associated with a content server on a network (e.g., servers 106 and/or 108) or a user's device (e.g., device 101-104 or device 200 from FIGS. 1-2). Database 320 comprises a dataset of data and metadata associated with local and/or network information related to users, services, applications, content and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's biometric data, user attributes, user preferences or settings, user demographic information, user location information, user biographic information, and the like, or some combination thereof. As discussed above, such user data can be stored anonymously such that no identifying information about the user or the pretense under which it was captured, retrieved, identified or obtained is included therein.

According to some embodiments, information related to, derived from or otherwise determined from the capture and/or analysis of a user's image(s) can be stored in database 320 as n-dimensional vector (or feature vector), where the information associated with each user's data/metadata can be translated as a node on the n-dimensional vector for a captured image(s). In some embodiments, the data/metadata for each instance of a user's capture can have its own vector where the information included therein can be represented by the nodes on a respective vector. In some embodiments, as images of users are captured, the determined user data/metadata can be stored in the database 320 in a similar manner.

In some embodiments, storage of captured images and the user data within database 320 can be realized through any known or to be known vector or array storage, including but not limited to, a linked list, a hash tree, queue, stack, VList, or any other type of known or to be known dynamic memory allocation technique or technology. It should be understood that any known or to be known computational analysis technique or algorithm, such as, but not limited to, cluster analysis, data mining, Bayesian network analysis, Hidden Markov models, artificial neural network analysis, logical model and/or tree analysis, and the like, and be applied to determine, derive or otherwise identify user information for/from captured images.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the detection engine 300, and the database of stored resources 320. Indeed, as illustrated in FIG. 3, the detection engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as detection engine 300, and includes face detection module 302, face extraction module 304, gallery storage module 306 and determination module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Turning to FIG. 4, Process 400 provides an example data flow for anonymously executing an adaptive facial recognition framework that anonymously distinguishes between known people and unknown people. As discussed herein, the framework recognizing faces within captured images without storing any information, or providing any tags, labels or annotations regarding or revealing the captured person's identity.

According to some embodiments of Process 400 of FIG. 4, Step 402 of Process 400 is performed by the face detection module 302 of detection engine 300; and Step 404 is performed by the face extraction module 304; Steps 406-408, 412-414 and 418-420 are performed by the determination module 308; and Steps 410 and 416 are performed by the gallery storage module 306.

Process 400 begins with Step 402 where an image (or video frame(s)) of a person is captured. The capturing of the image can be automatic when a user enters a location and is detected by a motion detection camera or can be manual, such as when a user is requesting access to a particular device or system.

It should be understood that while the disclosure will focus on the capturing of a single image, it is no so limiting, as one of ordinary skill in the art would understand the scope of the disclosed systems and methods can expand to the capture and analysis of a set of image frames or video frames, or other forms of images retrieved online or locally stored. For example, when a person enters a location, different angles or perspectives of the person can be captured and processed according to Process 400. Thus, while the discussion herein will focus on a single captured image of a user, one of skill in the art would not construe it as so limiting.

In Step 402, upon capturing of the image, engine 300 performs facial recognition on the image to detect the facial area from within the image. Such detection can be performed by any known or to be known facial recognition technology, application or mechanism, such as, but not limited to, geometric algorithms, photometric algorithms, three-dimensional (3D) algorithms and/or skin-texture algorithms, and the like. Thus, Step 402 results in a cropped face image of a detected person at a location.

In Step 404, the cropped face image is then analyzed to determine the face embeddings of the person. The face embeddings, as discussed above, can comprise a feature vector that represents the characteristics, attributes and/or features of the person, which were identified through the facial recognition processing in Step 402.

According to some embodiments, the face embeddings determination performed in Step 404 can be performed via any known or to be known machine-learning classifier or deep learning architecture, algorithm, technique or mechanism, including, but not limited to, deep neural networks (DNNs), artificial neural networks (ANNs), convolutional neural networks (CNNs), deep belief networks, linear classifiers (e.g., logistic regression, naive Bayes classifier), support vector machines, decision trees, boosted trees, random forest, neural networks, nearest neighbor algorithm, and the like.

As a result of such neural network analysis of the cropped face image, a feature vector (or numerical or value-based representation) of the person can be determined—($f_v$). As discussed above, the feature vector can numerically represent the traits of a person's face, as each dimension can represent a face's trait, and the nodes of each dimension can represent each trait's characteristics, attributes and/or features.

In Step 406, the determined face embedding data of the detected person is compared against each of the face embedding data previously stored in the gallery. The stored face embedding data in the gallery corresponds to previously seen or observed people at the location by engine 300. In some embodiments, such comparison can involve comparing each stored face embedding against the newly determined face embedding. In some embodiments, the comparison can involve querying the gallery based on the determined face embedding data of the detected person and searching for a match.

According to some embodiments, the gallery is a queue that is configured as a Least Recently Used (LRU) cache. This cache implements an algorithm that keeps recently used items near or at the top (or top or beginning) of the cache. Thus, in some embodiments, whenever a new item is accessed, updated and/or created, the LRU places it at the front of the cache. Thus, in some embodiments, only the tuple with the highest similarity is pulled out of its current position and re-inserted to the front of the gallery, and the relative order of the other items/tuples in the gallery does not change. According to some embodiments, as discussed below in relation to FIG. 5, when the cache limit has been reached, item(s) at the end of the cache will be removed to make room for new detection.

The use of the LRU configured gallery can therefore effectuate a faster search for more recent and similar visitors, which can evidence a reduced computational throughput thereby reducing memory usage and increasing the speed in which classifications of people can occur. Moreover, as discussed above, the gallery is configured as such in order to enable its adaptiveness in "memorizing" and "forgetting" faces based on their appearance/occurrence(s).

Thus, according to some embodiments, Step 406's comparison involves comparing each of the stored face embeddings in the ordered gallery against the detected person's face embeddings. In Step 408, as result of Step 406's comparison, engine 300 determines how similar each stored face embedding is to the detected persons' face embedding. Thus, Step 408 results in a similarity value being determined for each stored face embedding.

In Step 410, the stored face embedding with the highest similarity value to the person's face embedding is identified and is compared against a similarity threshold. The similarity threshold is set such that a person's feature vector matches a stored feature vector to a predetermined degree of similarity. The similarity values/scores for the comparison can be determined by using any known or to be known comparison algorithm, technique, program or technology, such as, but not limited to, a neural network.

In Step 412, a determination, based on the comparison on Step 410, is made regarding whether the stored face embedding's similarity value satisfies (e.g., is at or above) the similarity threshold.

If the similarity threshold is satisfied, then the detected person is identified as a "known." Step 414. Thus, the detected person is determined to match the stored face embedding with the highest similarity value to a threshold satisfying degree. This evidences that the detected person has been detected at the location previously (is known) and Process 400 proceeds to Step 416 where engine 300 updates the previously stored face embedding data for that person in the gallery.

In Step 416, the stored face embedding data determined to satisfy the similarity threshold from Step 412 is updated. Such face embedding data is referred to as the "matching face embedding data". Step 416 involves updating both the face matching face embedding data and the gallery. The gallery is updated by moving the position of the matching face embeddings data to the front (or beginning) of the gallery (if necessary). That is, if the matching face embedding data is already at the first position in the gallery, then it need not be moved. However, since the gallery is updated to reflect the most recent detected faces, the matching face embedding data is moved to the first position when it is not previously/currently at the first position within the gallery.

In some embodiments, Step 416's updating involves increasing a value of the matching face embedding data indicating a recency in which the person was detected. As discussed above, this does not involve any identifying information related to the person, or even the place where the detection occurred; rather, it involves increasing a value or counter that indicates how recently (and/or, in some embodiments, how many times) that specific face embedding data has been identified.

Turning back to Step 412, if the similarity threshold is not satisfied, then the detected person is identified as a stranger. Step 418. In such instances, as discussed above, the person is not labeled with any identifying information, nor is the location he/she is detected at indicated. The face embedding data of the person is stored as new face embedding data in the gallery. As discussed above, the gallery is a queue that is updated each time a face (e.g., new or old) is detected, and such updating involves moving the newly detected face to the top of the gallery. Therefore, Step 420 involves storing the detected person's face at the top/beginning of gallery and moving each of the previously stored face embeddings down a slot in the queue. In some embodiments, the storage of the new face embedding data can only be performed upon the proper read-write permissions.

In Step 422, in some embodiments, an alert can be automatically generated and disseminated to a user(s) at the location or an authority (e.g., a security group or police department) that indicates that the person detected is a stranger. In some embodiments, the alert can cause security protocol to occur, such as, for example, locking a device, locking a set of doors or sounding an alarm.

Turning to FIG. 5, Process 500 provides an example data flow for maintaining a proper gallery size of observed people that corresponds to how the disclose framework will be used at a location. According to some embodiments, the gallery size of known and unknown people can be scaled to fit the environment in which the framework will be deployed. This can effectuate a more streamlined, accurate and up-to-date system that houses and utilizes face embeddings in order to properly recognize observed people according to the needs of specific locations, situations and/or events. Thus, the maximum size of the gallery is to be determined by the business that is using it, and typically it is a function of the number of expected faces and the number of distinguished angles from which faces can be seen (which, as discussed above, can involve each being stored as a separate vector even if belonging to the same person).

For example, in embodiments where the flow of people visiting a location is large, for example a mall, the gallery size can be large—for example, 1,000 people. This means that the gallery houses face embedding data for 1,000 observed occurrences of people (both known and unknown). As discussed above, this does not mean 1,000 different people, but rather 1,000 unique face embeddings for observed people at a location, where some of the face embedding data can be for the same person.

In another non-limiting example, an office may have a gallery size set to the number of people that work at the office. Therefore, should a visitor of the office location who does not work there enter the premises, they can be recognized as a stranger.

In yet another non-limiting example, a family home's security system can implement the disclosed framework. For example, a security service provider (e.g., ADT®) can be advised that there are 4 family members living at the house, 1 maid who comes bi-weekly and 1 landscaper who comes weekly. Therefore, the gallery size for that specific house can be set 6. Therefore, when a delivery person arrives at the front door, the system can recognize them as a stranger.

According to some embodiments of Process 500 of FIG. 5, Steps 502-514 of Process 500 are performed by the gallery storage module 306 of detection engine 300.

Process 500 begins with Step 502 where the type of usage of the disclosed framework is identified. In some embodiments, this can be provided by a user, an administrator, the provider of the system and the like, or some combination thereof. In some embodiments, the usage of the system can be determined based on the location and context upon which it will be applied. For example, the location may be an office with an expected usage (or attendance) of N people; however, the office is having a holiday party where spouses are expected to attend, so for that event, the usage may be increased to N+X people.

In Step 504, the size of the gallery for that specific usage is determined. For example, the usage of the system is at an office park for a specific company residing on a specific floor of a building. Engine 300 can take this information as input and determine that the gallery size for that specific company's security system should be set at the number of employees that work on that specific floor.

In Step 506, the framework is deployed for use at a location and a person is observed at a location. As discussed above in Steps 418-420 of Process 400 of FIG. 4, the observed person is identified as new person to the location—e.g., a stranger. This, therefore, causes the engine 300 to input new face embedding data into the top or front of the gallery, thereby increasing the gallery size by 1.

In Step 508, a determination is made whether the new face embedding data of the stranger causes the gallery size to increase to a value that exceeds the determined size of the gallery, from Step 504. If it does not, Process 500 stops. Step 510.

However, if it is determined that the gallery size now exceeds the size limit of the gallery determined in Step 504, then Process 500 proceeds to Step 512 where the face embedding data at the end of the gallery (e.g., the last tuple in the ordered LRU gallery) is removed/deleted to make room for the newly identified face embedding data, which will be inserted into the front of the gallery.

The deletion occurring in Step 512 ensures that the gallery size does not expand past it intended purpose, which from Step 502 above, is to serve a specific security purpose of an intended use. This also maintains the computation integrity of the framework so that the engine 300 does not need to analyze more face embeddings that intended for its use at a specific location or when providing a specific service.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "client" or "person" should be understood to refer to a user of an application or applications as described herein and/or a consumer of data supplied by a data provider. By way of example, and not limitation, the term "user" or "client" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   identifying, by a device, an image comprising content depicting a person currently at a location;
   analyzing, by the device, the image, and determining information indicating facial characteristics of the person;
   comparing, by the device, the face information to a set of face embeddings stored in a gallery hosted by storage, each stored face embedding comprising face information for previous person depictions captured at the location;
   determining, by the device, that the person is a stranger based on the comparison;
   updating, via the device, the gallery based on the stranger determination, updating the gallery comprising storing the face information as new face embedding data within the gallery, said storage comprising inserting the new face embedding data into a first position within the gallery and moving each previously stored face embedding down a position; and
   communicating, by the device, an alert to equipment at the location based on the stranger determination, the alert indicating additional security protocols that are to be implemented until further input, wherein the updated gallery includes face information of the person to avoid a subsequent alert in connection with the person.

2. The method of claim 1, further comprising:
   identifying at least one user associated with the location; and
   communicating an alert to a device of the identified user based on the stranger determination, the communicated alert comprising information identifying the determined stranger.

3. The method of claim 1, further comprising:
   making a determination that a second person currently at the location is a known person; and
   updating the gallery based on the known person determination by identifying stored face information for the known person, and increasing a value corresponding to a frequency or recency of detections of the known person at the location.

4. The method of claim 1, further comprising:
   analyzing the image, and identifying the face of the person within the content of the image; and cropping the image based on the identified face, wherein the analysis of the image is based on the cropped image.

5. A non-transitory computer-readable storage medium tangibly encoded with computer-executable instructions, that when executed by a device, perform a method comprising:
identifying, by the device, an image comprising content depicting a person currently at a location;
analyzing, by the device, the image, and determining information indicating facial characteristics of the person;
comparing, by the device, the face information to a set of face embeddings stored in a gallery hosted by storage, each stored face embedding comprising face information for previous person depictions captured at the location;
determining, by the device, that the person is a stranger based on the comparison;
updating, via the device, the gallery based on the stranger determination, updating the gallery comprising storing the face information as new face embedding data within the gallery, said storage comprising inserting the new face embedding data into a first position within the gallery and moving each previously stored face embedding down a position; and
communicating, by the device, an alert to equipment at the location based on the stranger determination, the alert indicating additional security protocols that are to be implemented until further input, wherein the updated gallery includes face information of the person to avoid a subsequent alert in connection with the person.

6. The method of claim 1, wherein the equipment comprises at least one of a device, a door, a lock and an alarm associated with the location.

7. The method of claim 6, wherein the additional security protocols comprise at least one of locking the device, locking the door, locking the lock and sounding the alarm.

8. The method of claim 1, further comprising:
determining that the insertion of the new face embedding data causes the gallery to exceed a predetermined size;
identifying face embedding data at the last position in the gallery; and
deleting the identified face embedding data.

9. The method of claim 8, wherein the predetermined size of the gallery is based on a type of the location.

10. The non-transitory computer-readable storage medium of claim 5, further comprising:
determining that the insertion of the new face embedding data causes the gallery to exceed a predetermined size;
identifying face embedding data at the last position in the gallery; and
deleting the identified face embedding data.

11. The non-transitory computer-readable storage medium of claim 5, further comprising:
identifying at least one user associated with the location; and
communicating an alert to a device of the identified user based on the stranger determination, the communicated alert comprising information identifying the determined stranger.

12. The non-transitory computer-readable storage medium of claim 5, further comprising:
making a determination that a second person currently at the location is a known person; and
updating the gallery based on the known person determination by identifying stored face information for the known person, and increasing a value corresponding to a frequency or recency of detections of the known person at the location.

13. The non-transitory computer-readable storage medium of claim 5, further comprising:
analyzing the image, and identifying the face of the person within the content of the image; and
cropping the image based on the identified face, wherein the analysis of the image is based on the cropped image.

14. The non-transitory computer-readable storage medium of claim 5, wherein the equipment comprises at least one of a device, a door, a lock and an alarm associated with the location.

15. The non-transitory computer-readable storage medium of claim 14, wherein the additional security protocols comprise at least one of locking the device, locking the door, locking the lock and sounding the alarm.

16. A device comprising:
a processor configured to:
identify an image comprising content depicting a person currently at a location;
analyze the image, and determine information indicating facial characteristics of the person;
compare the face information to a set of face embeddings stored in a gallery hosted by storage, each stored face embedding comprising face information for previous person depictions captured at the location;
determine that the person is a stranger based on the comparison;
update the gallery based on the stranger determination, updating the gallery comprising storing the face information as new face embedding data within the gallery, said storage comprising inserting the new face embedding data into a first position within the gallery and moving each previously stored face embedding down a position; and
communicate an alert to equipment at the location based on the stranger determination, the alert indicating additional security protocols that are to be implemented until further input, wherein the updated gallery includes face information of the person to avoid a subsequent alert in connection with the person.

17. The device of claim 16, wherein the equipment comprises at least one of a device, a door, a lock and an alarm associated with the location.

18. The device of claim 17, wherein the additional security protocols comprise at least one of locking the device, locking the door, locking the lock and sounding the alarm.

* * * * *